No. 663,972. Patented Dec. 18, 1900.
W. LOEFFLER.
STEAM ENGINE.
(Application filed May 31, 1900.)
(No Model.) 2 Sheets—Sheet 1.
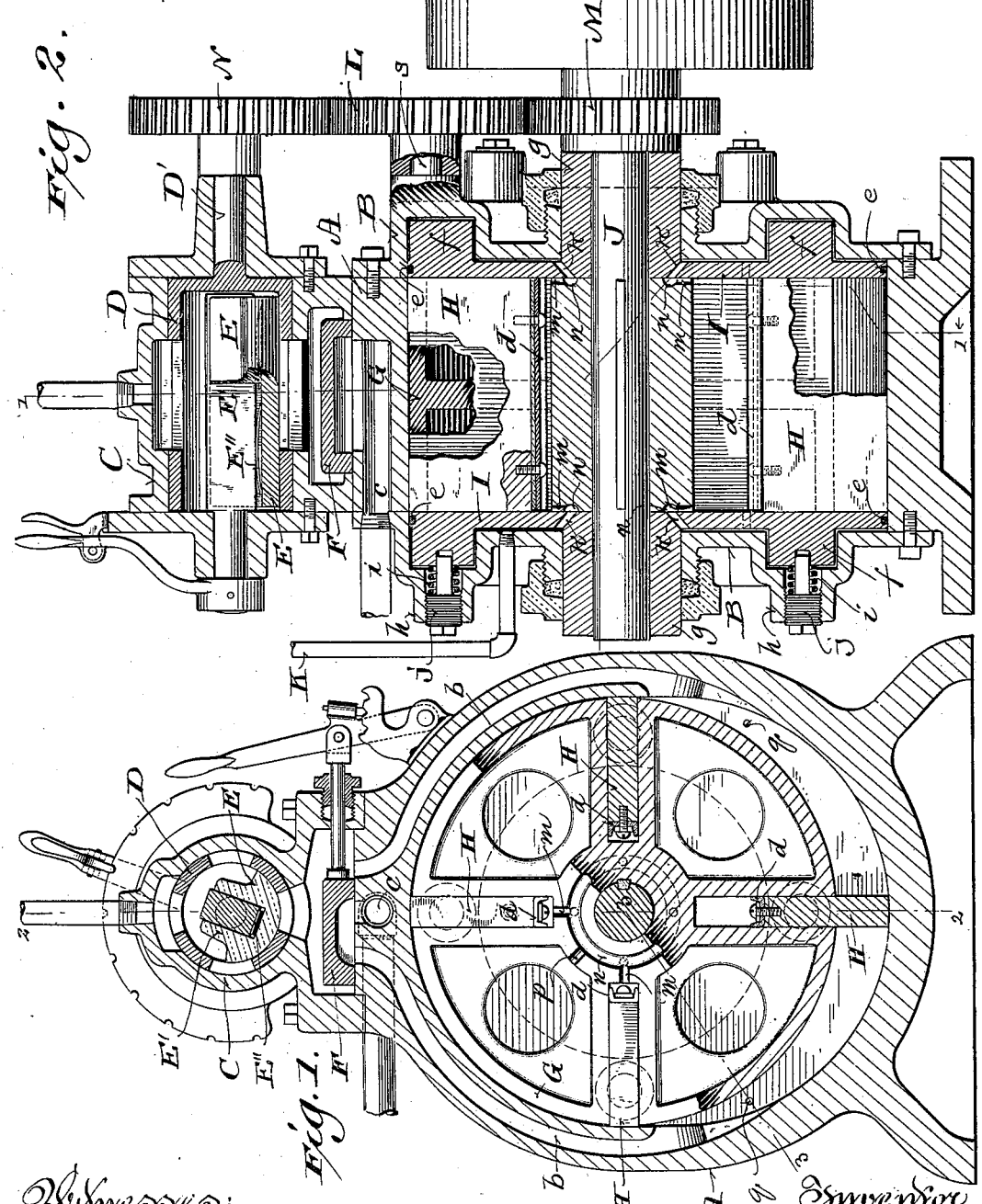
Witnesses:
Geo. W. Young.
N. E. Oliphant.
Inventor
William Loeffler
By H. G. Underwood.
Attorney No. 663,972. Patented Dec. 18, 1900.
W. LOEFFLER.
STEAM ENGINE.
(Application filed May 31, 1900.)
(No Model.) 2 Sheets—Sheet 2.
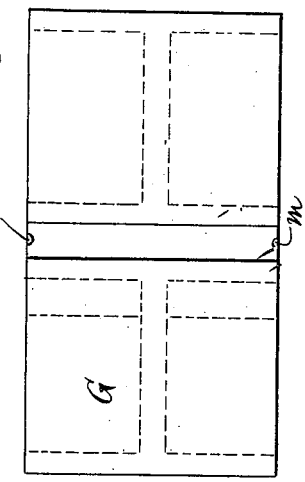
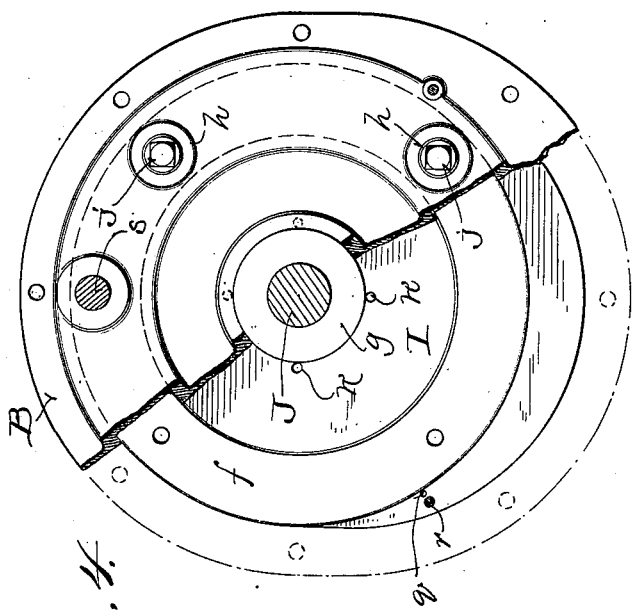
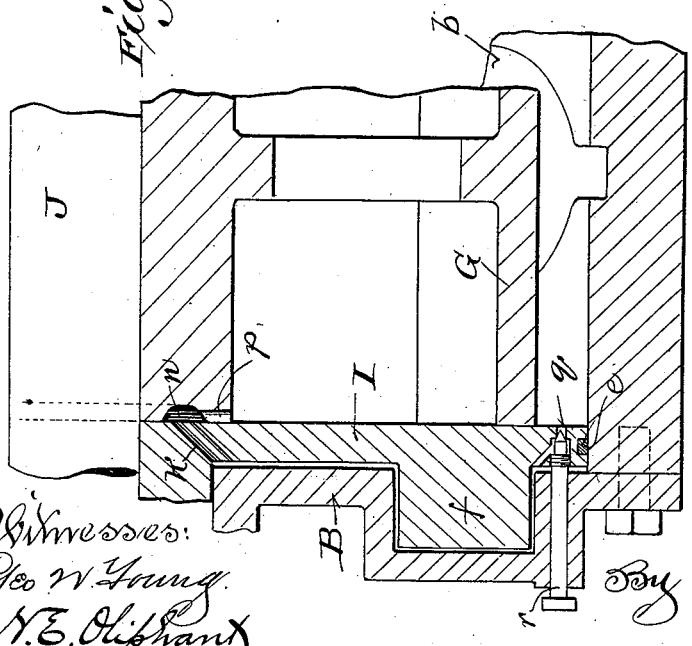
Witnesses:
Geo. W. Young.
N. E. Oliphant.
Inventor
William Loeffler
By H. G. Underwood
Attorneys

UNITED STATES PATENT OFFICE.

WILLIAM LOEFFLER, OF SHEBOYGAN, WISCONSIN.

STEAM-ENGINE.

SPECIFICATION forming part of Letters Patent No. 663,972, dated December 18, 1900.

Application filed May 31, 1900. Serial No. 18,512. (No model.)

*To all whom it may concern:*

Be it known that I, WILLIAM LOEFFLER, a citizen of the United States, and a resident of Sheboygan, in the county of Sheboygan and State of Wisconsin, have invented certain new and useful Improvements in Steam-Engines; and I do hereby declare that the following is a full, clear, and exact description thereof.

My invention has for its object to provide simple, economical, and efficent steam-engines of the rotary type, the same consisting in certain peculiarities of construction and combination of parts hereinafter particularly set forth with reference to the accompanying drawings and subsequently claimed.

Figure 1 of the drawings represents a sectional view of my rotary type of steam-engine and is indicated by line 1 1 in the succeeding figure, the piston of the engine being partly in side elevation; Fig. 2, another for the most part sectional view of the engine on the plane indicated by line 2 2 in the preceding figure; Fig. 3, a detail section view indicated by line 3 3 in the first figure; Fig. 4, a similar view that principally illustrates a portion of a cylinder-head and a spring-controlled packing-plate having an annular flange engaging a corresponding groove in said head; and Fig. 5, a face view of the aforesaid piston, a reciprocative gate that would ordinarily appear in this view having been withdrawn.

Referring by letter to the drawings, A indicates the shell of the cylinder constituting part of my improved engine, the bore of this shell having practically the contour of two meeting segments of circles of like radius struck from different centers on the same plane. The cylinder-heads B are bolted to the shell A, and in like connection with the horizontal upper portion of said shell is a steam-chest C, containing a rotary valve in the form of a cylindrical shell D, provided with longitudinal apertures of predetermined number and width at regular intervals thereof. A lever-controlled cut-off valve E is adjustable in the rotary valve to control area of its apertures with respect to the passage of live steam to one or the other of opposite passages $b\,b$ in the shell-wall of the engine-cylinder, and by means of a lever-controlled slide-valve F in the steam-chest one or the other of said passages is opened to an exhaust-chamber $c$ in said cylinder, there being communication between the steam-chest chambers containing the rotary and slide valves. As a matter of detail the cut-off valve is shown as a longitudinally-grooved block having a segmental face, and an angular shank $E'$, fitting the groove against leaf-springs $E''$, is made fast to the valve-controlling lever.

Contained in the cylinder aforesaid is an annular rotary piston G, having the same center and approximately the same radius as one of the circles of which a portion of the cylinder-bore contour is a segment. The piston is provided at regular intervals with radial pockets for reciprocative gates H, these gates being the same in number as the apertures in the rotary valve aforesaid. The length of each gate is equal to the width of the face of the piston, the latter being shown as having its hub, rim, and gate-pockets connected by apertured webs. Packing $d$ is secured to the inner edges of the gates to make them steam-tight in the pockets aforesaid, and the ends of these gates and pockets are opposed by plates I, having the same contour as the cylinder-bore in which they are fitted, packing $e$ being provided in rim-grooves of the plates.

Each plate I is provided with an outer annular flange $f$, that fits a corresponding groove in the adjacent cylinder-head, and this flange is concentric with a plate-hub $g$, that constitutes a bearing for a shaft J, on which the aforesaid piston is keyed. The shaft-bearings engage stuffing-boxes on the cylinder-heads, and hollow bosses $h$ of these heads contain spiral springs $i$ in opposition to the flanges of said plates, tension of the springs being regulated by screw-plugs $j$ engaging said bosses and plate-flanges.

The plates I are provided with ports $k$ adjacent to their hubs, and radial recesses $m$ in the ends of the piston-hub, extending from its periphery to annular groove $n$, pass said ports. The hub-recesses $m$ of the piston communicate with the gate-pockets, and live steam admitted from a pipe K, in union with one of the cylinder-heads, finds its way from one side to the other of the engine. By means of leads $p$ from the annular grooves $n$ in the hub ends of the piston the steam also finds its way into the space between gate-pockets of said piston. The steam operates to balance the plates I, whereby they are held in frictional contact with the piston pockets and gates by the expansive force of the springs $i$ aforesaid, the area between the plate-hubs and flanges being equal to that of the piston not in frictional contact with said plates, which latter are provided with steam-ports $q$ beyond its flanges. These ports are governed by adjustable pin-valves $r$, one of the latter being run in when the other is run out according to the predetermined direction of revolution on the part of the piston to thereby insure the steam-balance of those portions of the plates I beyond their annular flanges $f$ that engage the grooves in the cylinder-heads.

A spur-wheel L, loose on a cylinder-head stud $s$, meshes with similar wheels M N, that are respectively fast on the piston-shaft J and a shank D' of rotary valve D, a bearing for this shank being provided on a side of the steam-chest. All of the spur-wheels are of the same diameter and tooth, and thus it is evident that the rotary valve will move in synchrony with the piston.

In practice the slide-valve F being set to open one of the cylinder-passages $b$ to live steam from chest C and the other to exhaust according to direction of movement desirable on the part of the piston, the cut-off valve positioned to regulate the area of the rotary-valve apertures, and the pin-valves $r$ properly adjusted, steam is let on through pipe K and said chest to balance plates I and rotate said piston, the reciprocative gates H of which are successively exposed in that portion of the cylinder-bore eccentric to the aforesaid piston. The piston-gates are moved outward from their pockets by the steam admitted through pipe K, and their retraction is cushioned by the same steam.

By employment of the cut-off valve herein set forth the engine may be driven by full head of steam-pressure or made to utilize expansive force of the steam to a greater or less extent, according to the adjustment of said valve.

Having thus described my invention, what I claim as new, and desire to secure by Letters Patent, is—

1. A steam-engine comprising a cylinder the bore contour of which approximates meeting segments of circles of like radius struck from different centers on the same plane, an annular piston in the cylinder having the same center and approximating the same radius as one of the aforesaid circles, movable gates in radial pockets at regular intervals of the piston, packing-plates in opposition to the piston pockets and gates, springs under tension arranged to hold the plates in working position, a shaft fast in the piston central of same and having its bearings in hubs of said plates, a hollow rotary valve arranged in a chamber that being open to steam-supply communicates with one of two opposite passages in the cylinder the other of these passages being open to exhaust and the valve provided with apertures at regular intervals corresponding numerically with the piston-gates, and gearing connecting said shaft and valve, whereby the latter operates in synchrony with the aforesaid piston, provision being had for utilization of steam to balance the aforesaid plates and move said piston-gates in an outward direction.

2. A steam-engine comprising a cylinder the bore contour of which approximates meeting segments of circles of like radius struck from different centers on the same plane, an annular piston in the cylinder having the same center and approximating the same radius as one of the aforesaid circles, movable gates in radial pockets at regular intervals of the piston, packing-plates in opposition to the piston pockets and gates, springs under tension arranged to hold the plates in working position, a shaft fast in the piston central thereof and having its bearings in hubs of said plates, a hollow rotary valve arranged in a chamber that being open to steam-supply communicates with one of two opposite passages in the cylinder, the other of these passages being open to exhaust and the aforesaid valve provided at regular intervals with apertures corresponding numerically with the piston-gates, a cut-off valve adjustable in the rotary one to regulate area of its apertures, and gearing connecting said shaft and rotary valve whereby the latter operates in synchrony with the aforesaid piston, provision being had for utilization of steam to balance the aforesaid plates and move said piston-gates in an outward direction.

3. A steam-engine comprising a cylinder the bore contour of which approximates meeting segments of circles of like radius struck from different centers on the same plane, an annular piston in the cylinder having the same center and approximating the same radius as one of the aforesaid circles, movable gates in radial pockets at regular intervals of the piston, packing-plates in opposition to the piston pockets and gates, springs under tension arranged to hold the plates in working position, a shaft fast in the piston central thereof and having its bearings in hubs of said plates, a hollow rotary valve arranged in a chamber that being open to steam-supply communicates with one of two opposing passages in the cylinder, the other of these passages being open to exhaust and the aforesaid valve provided with apertures at regular intervals corresponding numerically with the piston-gates, a slide-valve controlling the cylinder-passages, a cut-off valve adjustable in the rotary one to regulate area of its apertures, gearing connecting said shaft and rotary valve, whereby the latter operates in synchrony with the aforesaid piston, provision being had for utilization of steam to balance the aforesaid plates adjacent to the piston and move said piston-gates in an outward direction, and valves controlling ports in those portions of the packing-plates beyond annular flanges of same engaging corresponding cylinder-head grooves.

In testimony that I claim the foregoing I have hereunto set my hand, at Sheboygan, in the county of Sheboygan and State of Wisconsin, in the presence of two witnesses.

WILLIAM LOEFFLER.

Witnesses:
ALBERT BLANKE,
OSCAR KLEIN.